Aug. 31, 1965  D. C. ROWE  3,203,573
FOOD CONTAINERS
Filed April 26, 1963  2 Sheets-Sheet 1

INVENTOR.
DONALD C. ROWE
BY
Smith and Mattern
ATTORNEYS

Aug. 31, 1965 D. C. ROWE 3,203,573
FOOD CONTAINERS
Filed April 26, 1963 2 Sheets-Sheet 2

INVENTOR.
DONALD C. ROWE
BY
Smith and Mattern
ATTORNEYS

United States Patent Office 3,203,573
Patented Aug. 31, 1965

3,203,573
FOOD CONTAINERS
Donald C. Rowe, Box 231, La Conner, Wash.
Filed Apr. 26, 1963, Ser. No. 275,901
3 Claims. (Cl. 220—23.6)

This invention relates to containers for loading, transporting, storing and unloading foods. The containers are especially useful as berry picking flats. When properly filled with berries, the containers are stacked, one directly upon the other without the danger of crushing the berries, yet when empty the containers are stacked closely nestled together by rotating every other one end-for-end.

Heretofore known types of berry containers or flats, especially those used to contain strawberries, raspberries and blackberries, have been recognized as inadequate. Wooden flats, commonly used today, do not nest together, require equal amounts of storage space, whether loaded or empty. Probably because of the quality of wood used and the method of construction, these wood flats soon are damaged in use, becoming completely inadequate and/or acquiring sharp edges and/or tear-outs which result in berry crop losses.

Other containers or flats of different designs and materials are known to have been proposed. However, the wood flat is still used probably because of its low cost basis. The other proposed designs were often too complex for low cost manufacture and they were lacking in additional benefits to justify their added cost.

Among the invention objectives in providing the food containers or flats are:

A structural configuration which is easily manufactured at low cost from sheet material, substantially uniform in thickness and strength;

A structural arrangement providing smooth contoured spaces defining loading limits which result in the complete containment of the foods without losses caused by dropping, crushing and/or tearing;

A related structural interfitting assembly between containers or flats which—upon stacking loaded containers avoids crushing losses and maintains circulating ventilating air passages—upon stacking empty containers permits their nesting to reduce their overall space requirements during storage and hauling, and—upon stacking, whether loaded or empty, permits their interlocking between adjacent stacks at all their respective ends;

A structural contour and material composition throughout its entirety which is easily cleaned in sprays or baths of water, steam and air, and easily disinfected in sprays or baths of chemicals, avoiding the spread of mites and gray mold, and eliminating the need for special one-use lining materials, paper or thin wood hallicks;

A structural overall size and exterior contour which is easily handled by personnel, carried on conventional transportation devices, such as field picking carts and trucks, and brushed through vine undergrowth, all without bending or buckling at any time;

A structural configuration resistive to damage, yet easily repaired as necessary and having an expectant long life.

These and other objects of the invention will be understood more fully as the following description is read and references made to the accompanying drawings, wherein like numerals refer to like parts throughout, and where:

Figure 1:
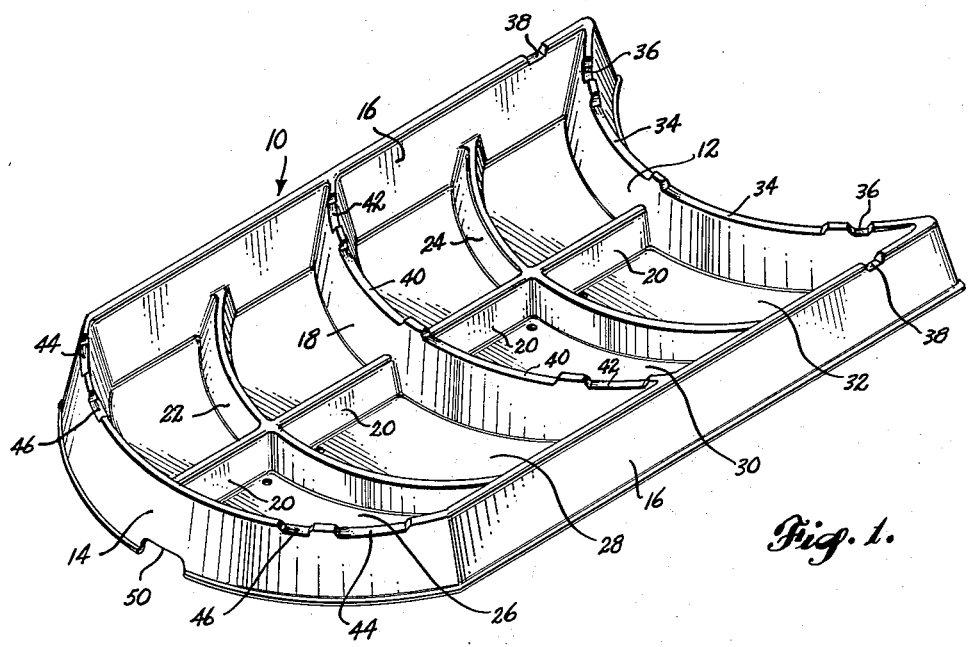
FIGURE 1 is a perspective view of the food container.

Referring to FIGURE 1, the container 10 in its preferred embodiment is longer than it is wide and of reasonable depth. One size used is 30 inches long, 18 inches wide and 3 or more inches deep. The tray 10 has side walls 16. The side walls 16 are preferably parallel to one another. The front wall 14 is convex and the rear wall 12 is concave when viewed from outside the container, flat or tray 10. These front and rear walls 12 and 14 are also preferably formed along arcs of circles of equal radii. Similarly formed is a transverse central partition 18 located at or near the midpoint between the front 14 and rear 12 walls. All these side and end walls and the transverse central partition are of the same height which is also substantially the height of the container.

Further subdivision of the container loading space is done by forming, during the initial manufacturing process, lower height partitions. One partition is a center divider 20 parallel to the higher sides 16 being approximately a little more than half as high. Another intermediate lower partition 22, orientated transversely of partition 20 and extending between the walls 16, forms additional subdivisions between the front wall 14 and the central partition 18 following a like radius. Another intermediate lower partition 24, like partition 22, forms additional subdivisions between the central partition 18 and the rear wall 12. Thus optionally the container is subdivided into eight distinct compartments by the strengthening rib-like high and low partitions.

Preferably, the container 10 is made of a sheetlike material, such as thermosetting plastics. A single sheet of material is formed into the completed container in a single heating-molding operation followed by minor edge trimming and drain hole drilling or punching operations. The uniform thickness and strength of the starting material is essentially retained so the formed container has a uniform thickness throughout. Assuming like starting materials are used, all the containers formed are substantially uniform and consistent in size and weight.

Also the outer walls, dividers and/or partitions are formed as inverted V's, called reverse formed walls. Such space defining structure serves the important function of providing rigidity throughout the container without resorting to the specific placement of separate reinforcing members or other more complicated ways of forming the starting sheet material into localized greater masses for rigidity purposes. Also this inverted V structure, with the intervening flat portions, establishes an easily cleaned and disinfected overall container configuration. For convenience of handling the containers during these cleaning operations and all hand movements of single containers or groups of containers, centered cutouts 50 and 51 are provided at each container end in the outer V leg portion to accommodate gripping fingers of the user.

Figure 4:
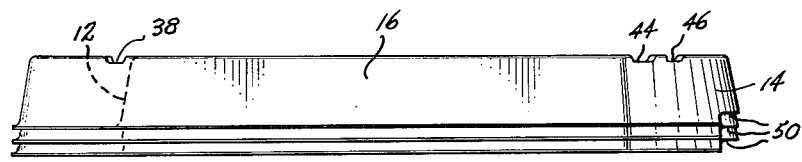
FIGURE 4 is a side elevational view showing how the unloaded containers nest one into the other during storage and for hauling.

This reverse form wall or inverted V strengthening and space defining structure is arranged, as indicated in FIGURE 4, in non-interference alignment with similar structure of each food container when all the front ends 14 and all the back ends 12 are located respectively above one another. So arranged, the food containers 10 are nested conveniently interlocking one with the other. One hundred containers, of the size described previously, when nested together occupy a volume defined by the maximum width and length of one container and a total height of approximately six feet. Such stacks of nested containers are interlocked one with the other by inserting the convex front ends 14 of one stack into the concave rear ends 12 of an adjacent stack. This interlocking capability of two adjacent food containers, multiplied as the respective adjacent stacks increase in height, is very effective during hauling and storage, avoiding inconveniences, losses, damages, and possible injuries to personnel by insuring the nested stack will remain upright and aligned on truck beds, carts, pallets, floors and the ground.

This interlocking advantage between stacks is not lost but merely readjusted when the food containers are loaded. In each stack, each follow on container is rotated one hundred and eighty degrees, placing front ends 14 over rear or back ends 12, as noted in FIGURE 2. Each level of containers interlock at their ends as before with the arrangement alternating from level to level in the stacks of filled containers 10.

Figure 2:
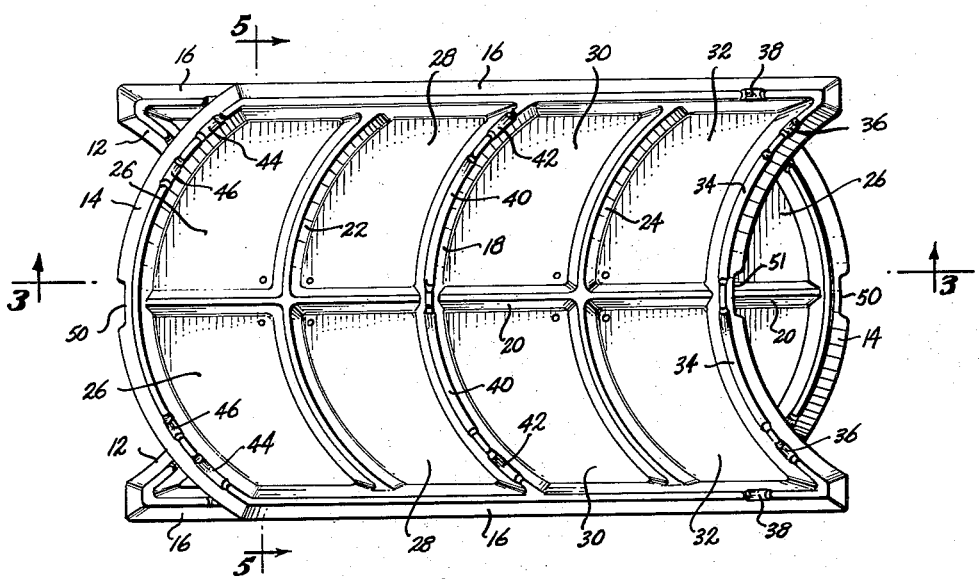
FIGURE 2 is a top view of one container stacked upon another in their loaded positions.
Figure 3:
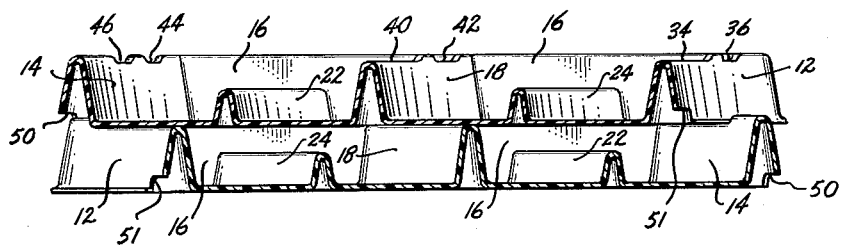
FIGURE 3 is a cross sectional view taken along line 3—3 of FIGURE 2 showing how the containers stack upon one another and how they are formed from sheet material.
Figure 5:
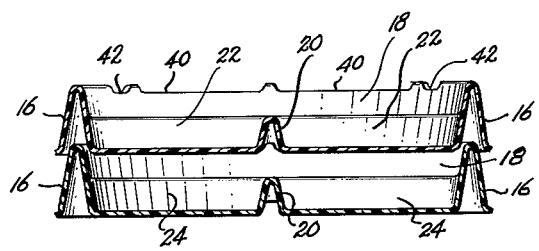
FIGURE 5 is a cross sectional view taken along the line 5—5 of FIGURE 2 showing the relationship of the side walls of the stacked containers in their loaded position indicating the ventilating spacing between them.

As noted in FIGURES 2, 3 and 5, there still remains an interfitting positive positioning relationship between each level of each stack of loaded food containers. An overall desirable interference remains whether the containers 10 are stacked nested together for minimum space occupancy or stacked for defining food storage chambers while the foods are collected, handled and transported in protected and ventilated compartment surroundings.

This interlocking, ventilated stacking of the loaded containers 10, one on top of the other, is facilitated by originally forming astutely located slightly lower crowns or top edge portions of the higher sides 16, fronts 14, backs 12 and dividers 18, or partitions as illustrated in all figures. Each container 10 has front compartment bottoms 26, middle front compartment bottoms 28, rear compartment bottoms 32 and middle rear compartment bottoms 30 which are all at substantially the same level as the lower outside edges of the outer walls 12, 14 and 16. With the lower outer edges these bottoms of one container contact the lower segments of the crowns or tops on the outer walls 12, 14 and 16 and the central partition 18 of a lower container establishing an aligning and interlocking stacking cooperating relationship between the two or more containers 10. Longitudinal and also lateral inadvertent movements of the containers 10, one above the other, with respect to each other are eliminated, overcoming tendencies of the containers 10 to slide and to resist uniform stacking.

More specifically, this aligning and interlocking structure of the containers 10 is obtained by forming: lower tops or crowns 34 on rear wall 12 disposed symmetrically on each side of its center to accommodate front compartment floors or bottoms 26 of the container lowered from above; also, lower crowns 36 on the rear wall 12 between the lower crowns 34 and the rear corners of the container to receive the outside edge of the front convex wall 14 of the above container; lower crowns 38 in rear ends of the outside walls 16 to guide the lower outside edge of front wall 14 of the resting container, the lower crowns 36 and 38 being disposed to coincide with the curved front wall 14 lower edge; lower crowns 40 on the central partition or divider 18 equally spaced on either side of the partition 18 center to accommodate the middle rear compartment bottoms 30 of the above container; lower crowns 42 also on the central partition 18 but farther removed from its centerline beyond the lower crowns 40 and near the side walls 16 to receive the rear outer corners of the middle front compartment bottoms 28; lower crowns 44 on the front wall 14 to receive the outer rear corners of rear compartment bottoms 32 of the above container; and lower crowns 46 also on the front wall 14 to receive the outside edge of the rear wall 12. With each above container being lowered into position with its corresponding portions resting on the respective lower top or crown portions of the lower container, in addition to the aligning and interlocking cooperating relationship, a complete ventilating orientation of the stacked loaded containers is created as particularly illustrated in FIGURES 3 and 5. Circulating air can pass through the spaces left between the respective aligned outer walls of all respective pairs of containers 10 throughout the locations of their sides 16 and ends 12 and 14. Through the spaces the refreshing circulating air reaches all compartments without difficulty helping to preserve the harvested foods, such as picked berries, while they are handled, transported and stored in the interlocked stacks of loaded trays, flats or containers 10.

If each container is loaded with reasonable care to a substantially uniform depth ranging between respective elevations of the lower divider tops and the higher divider or wall lower crowns, preferably just below the lower crowns, the harvested foods will not be crushed when containers are lowered from above into their aligning, interlocking and ventilating engagements with the previously loaded containers.

I claim.

1. An integrally formed, compartmented, stacking and nesting container, for foods, of uniform thickness material providing multiple compartments of uniform elevation bottoms and varying height upstanding walls, which walls, throughout the container, are of inverted V cross-section to permit nesting of identical containers one above the other, said walls including straight parallel longitudinally extending side walls and parallel convex-concave end walls and a transverse central wall, all of uniform height, and other walls of lesser height and including a central longitudinal wall paralleling said side walls, and centrally positioned laterally extending curved walls paralleling said end walls, all of said higher walls having their tops deformed to provide restrictive ledges below the level of the tops of said walls to receive and align any like container placed above, after it has been oriented 180° from its nesting position, the restrictive ledges being so located and spaced that the outer portions of the inverted V walls of the containers remain substantially free of one another, thereby insuring good ventilation through the ventilated space above the height determined by the lower compartment walls.

2. A container, as claimed in claim 1, wherein all the uniform elevation bottoms of the compartments have drainage openings to keep the contents free of excessive collecting moisture.

3. A container, as claimed in claim 1, wherein the end walls are formed with centered hand gripping recessed structures in the outer portions of the walls constituting the same.

References Cited by the Examiner

UNITED STATES PATENTS

| 2,352,684 | 7/44 | Braddock | 220—23.6 |
| 2,758,750 | 8/56 | Stroop. | |
| 2,774,511 | 12/56 | Menkin | 220—97 |
| 2,896,809 | 7/59 | Metzger | 220—23.6 |

FOREIGN PATENTS

| 1,208,481 | 2/60 | France. |
| 1,000,737 | 1/57 | Germany. |

THERON E. CONDON, *Primary Examiner.*

EARLE J. DRUMMOND, *Examiner.*